(12) United States Patent
Shah et al.

(10) Patent No.: US 11,706,568 B2
(45) Date of Patent: *Jul. 18, 2023

(54) DEVICES, SYSTEMS AND PROCESSES FOR PROVIDING ADAPTIVE AUDIO ENVIRONMENTS

(71) Applicant: DISH Network L.L.C., Englewood, CO (US)

(72) Inventors: Rima Shah, Broomfield, CO (US); Nicholas Brandon Newell, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/516,425

(22) Filed: Nov. 1, 2021

(65) Prior Publication Data
US 2022/0060831 A1 Feb. 24, 2022

Related U.S. Application Data

(63) Continuation of application No. 16/257,330, filed on Jan. 25, 2019, now Pat. No. 11,197,097.

(51) Int. Cl.
*H04R 5/04* (2006.01)
*H04L 65/60* (2022.01)
(Continued)

(52) U.S. Cl.
CPC .............. *H04R 5/04* (2013.01); *G06N 20/00* (2019.01); *H04L 65/60* (2013.01); *H04R 5/033* (2013.01); *H04S 7/304* (2013.01);

*H04W 4/38* (2018.02); *H04R 2420/07* (2013.01); *H04R 2460/07* (2013.01)

(58) Field of Classification Search
CPC ......... G06T 19/006; G06T 1/163; H04W 4/38
See application file for complete search history.

(56) References Cited

U.S. PATENT DOCUMENTS 9,886,954 B1 * 2/2018 Meacham ........... G10L 21/0208
10,394,324 B2 * 8/2019 Drake ................... A61M 21/00
(Continued)

OTHER PUBLICATIONS

Emotiv, downloaded from the Internet on Nov. 7, 2018 at https:www.emotiv.com/product/emotiv-epoc-14-channel-mobile-eeg/#tab-description.

(Continued)

*Primary Examiner* — Douglas Godbold
(74) *Attorney, Agent, or Firm* — Wash Park IP Ltd.; John T. Kennedy (57) ABSTRACT

Devices, systems and processes for providing an adaptive audio environment are disclosed. For an embodiment, a system may include a wearable device and a hub. The hub may include an interface module configured to communicatively couple the wearable device and the hub and a processor, configured to execute non-transient computer executable instructions for a machine learning engine configured to apply a first machine learning process to at least one data packet received from the wearable device and output an action-reaction data set and for a sounds engine configured to apply a sound adapting process to the action-reaction data set and provide audio output data to the wearable device via the interface module.

20 Claims, 3 Drawing Sheets

(51) Int. Cl.
*G06N 20/00* (2019.01)
*H04W 4/38* (2018.01)
*H04R 5/033* (2006.01)
*H04S 7/00* (2006.01)

(56) References Cited

U.S. PATENT DOCUMENTS

| | | | | |
|---|---|---|---|---|
| 10,617,842 | B2* | 4/2020 | Espi Maques | A61B 5/165 |
| 10,631,743 | B2* | 4/2020 | Goldberg | A61B 5/02438 |
| 10,660,570 | B2* | 5/2020 | Cimenser | G06F 1/163 |
| 10,694,018 | B2* | 6/2020 | Kang | H04M 1/72409 |
| 11,197,097 | B2* | 12/2021 | Shah | H04L 65/762 |
| 2007/0074619 | A1* | 4/2007 | Vergo | G10H 1/42 |
| | | | | 84/612 |
| 2008/0257133 | A1* | 10/2008 | Sasaki | G10H 1/0025 |
| | | | | 84/604 |
| 2015/0138065 | A1* | 5/2015 | Alfieri | G02B 27/017 |
| | | | | 345/156 |
| 2016/0077547 | A1* | 3/2016 | Aimone | A61B 5/1114 |
| | | | | 345/8 |
| 2017/0131965 | A1* | 5/2017 | Eerola | G10L 19/167 |
| 2018/0020971 | A1* | 1/2018 | Tsuruta | A61B 5/486 |
| | | | | 340/575 |
| 2019/0088243 | A1* | 3/2019 | Prasad | G10K 11/1754 |
| 2019/0212158 | A1* | 7/2019 | Gordon | G01C 21/3415 |

OTHER PUBLICATIONS

Project Alter Ego, downloaded form the Internet on Nov. 7, 2018 at https://www.media mit.edu/projects/alterego/frequently-asked-questions/#faq-what-is-alterego.

* cited by examiner

DEVICES, SYSTEMS AND PROCESSES FOR PROVIDING ADAPTIVE AUDIO ENVIRONMENTS

CROSS-REFERENCE TO RELATED APPLICATIONS

The present application claims priority to and is a Continuation of U.S. patent application Ser. No. 16/257,330, which was filed on Jan. 25, 2019, in the name of inventors Rima Shah and Nicholas Newell, and entitled "Devices, Systems and Processes for Providing Adaptive Audio Environments"; the entire contents of which are incorporated herein by reference.

TECHNICAL FIELD

The technology described herein generally relates to devices, systems and processes for providing adaptive audio environments.

BACKGROUND

Devices, systems and processes are needed for providing adaptive audio environments. As used herein, "user(s)" and/or "listener(s)" are used interchangeably to refer to those then immersed in an environment. Such an environment may include various conditions that can be detected, analyzed, monitored and otherwise processed by use of vision, audio, presence, motion, speed, location, mental and other sensors, and external data. Such an environment is referred to herein as a user's "total environment." A total environment may arise at any given time and anywhere a user is present, such as on a sidewalk, in an automobile, home, office, store, mall, train, bus, or otherwise. The total environment may include sub-environments such as an audio environment and a visual environment. As is commonly known, a visual environment may be augmented by visual indicators, such an augmented environment commonly being referred to as an augmented reality.

Likewise, an audio environment may be augmented by one or more audio systems, such as those provided in a car, home, public space (e.g., by way of public address systems), in-ear and/or over-ear speakers, and the like. With the prevalence today of commonly available audio systems, situations often arise where a given user's then arising audio environment is not optimized for a then arising total environment. At one extreme, non-optimization can result in unharmful conditions which facilitate user inefficiencies, disengagement, or other conditions. For example, a user reading a book may be distracted by daydreams or other thoughts unrelated to the content of the book. At another extreme, non-optimization may result in harmful and/or dangerous situations occurring, such as a user not recognizing an otherwise perceivable threat condition arising, such as vehicular hazards or otherwise. Yet, today no devices, systems or methods are available for detecting a user's then arising or near future arising total environment and providing, in response and/or in anticipation thereto, an adaptive audio environment. Thus, a need exists for devices, systems and processes for providing adaptive audio environments. A need also exists for devices, systems and processes for providing adaptive audio environments that are optimized in view of a then arising or near future arising user's total environment.

SUMMARY

The various embodiments of the present disclosure relate in general to devices, systems and processes for providing adaptive audio environments. In accordance with at least one embodiment of the present disclosure, a system for providing an adaptive audio environment may include a wearable device and a hub. The hub may include an interface module configured to communicatively couple the wearable device and the hub. The hub may include a processor, configured to execute non-transient computer executable instructions for a machine learning engine configured to apply a first machine learning process to at least one data packet received from the wearable device and output an action-reaction data set. The hub may include a processor, configured to execute non-transient computer executable instructions for a sounds engine configured to apply a sound adapting process to the action-reaction data set and provide audio output data to the wearable device via the interface module. The audio output data may be utilized by the wearable device to provide an adaptive audio environment.

For at least one embodiment, the wearable device may be configured to execute non-transient computer instructions for a wearable device input process configured to process first sensor data received from a first sensor. The first sensor data may include image data. The wearable device input process may be further configured to process at least one second sensor data received from at least one second sensor. For at least one embodiment, each of the first sensor data and the at least one second sensor data may be provided by at least one of an image sensor, a sound sensor, a physio sensor, a location sensor, and a motion sensor.

For at least one embodiment of a system for providing an adaptive audio environment, a wearable device input process may include applying a data packetization process to each of the first sensor data and the at least one second sensor data. A result of the data packetization process may be output by the wearable device to the hub as the at least one data packet.

For at least one embodiment of a system for providing an adaptive audio environment, the wearable device may include at least one sensor and at least one audio output device.

For at least one embodiment of a system for providing an adaptive audio environment, the machine learning engine may be configured to use feedback data when applying a second machine learning process to at least one second data packet received from the wearable device and output a second action-reaction data set. The sounds engine may be further configured to apply a second sound adapting process to the second action-reaction data set and provide second audio output data to the wearable device via the interface module. The second audio output data may be further utilized by the wearable device and the at least one audio output device to provide the adaptive audio environment.

For at least one embodiment of a system for providing an adaptive audio environment, the wearable device may be configured to execute non-transient computer instructions for a wearable device output process. The wearable device output process may be configured to process the audio output data for presentation to a user by the at least one audio output device.

For at least one embodiment of a system for providing an adaptive audio environment, the interface module may be further configured to communicatively couple the hub with at least one server. The server may be configured to communicate external data to the hub. Based on the external data, the machine learning engine may be further configured to apply a second machine learning process to the at least one data packet received from the wearable device and output a second action-reaction data set.

In accordance with at least one embodiment of the present disclosure, a software architecture, encoded on at least one non-transitory computer readable medium for providing an adaptive audio environment may include a wearable device input process. The wearable device input process may include non-transient computer instructions, executable by a wearable device, for processing first sensor data received from a first sensor and outputting at least one data packet. A wearable device output process may be used and include non-transient computer instructions, executable by the wearable device, for receiving and processing audio output data into at least one sound for use in providing an adaptive audio environment to a user of the wearable device. The audio output data may be received from and result from a processing of the at least one data packet by the hub.

For at least one embodiment of the software architecture, the first sensor data may be received from at least one of an image sensor, a sound sensor, a physio sensor, a location sensor, and a motion sensor.

For at least one embodiment of the software architecture, a machine learning process may include non-transient computer instructions, executable by the hub, for processing the at least one data packet into an action-reaction data set.

For at least one embodiment of the software architecture, a sound adapting process may include non-transient computer instructions, executable by the hub, for processing the action-reaction data set into audio output data.

For at least one embodiment of the software architecture, the machine learning processes may utilize user preference data stored in a user preference database to process the at least one data packet int an action-reaction data set.

For at least one embodiment of the software architecture, the sound adapting process may utilize sound data stored in a sounds database to process the action-reaction data set into the audio output data.

For at least one embodiment of the software architecture, at least one of the machine learning process and the sound adapting process may include at least one supervised machine learning algorithm trained using an initial default data set corresponding to a generic total environment.

In accordance with at least one embodiment of the present disclosure, a method for providing an adaptive audio environment may include operations performed in a wearable device and in a hub device. For at least one embodiment, operations performed in a wearable device may include receiving sensor data, processing the sensor data using at least one wearable device input process into a data packet, outputting the data packet to a hub device, receiving audio output data from the hub device and applying at least one wearable device output process to the received audio output data to produce at least sound providing an adaptive audio environment for a user. For at least one embodiment, operations performed in a hub device may include receiving the data packet from the wearable device, applying at least one hub process to the data packet and outputting the audio output data. The audio output data may result from the applying of the at least one hub process to the data packet.

In accordance with at least one embodiment of the present disclosure, a method for providing an adaptive audio environment may include use of sensor data that includes first sensor data received from an image sensor and second sensor data received from at least one of a sound sensor, a physio sensor, a location sensor and a motion sensor.

In accordance with at least one embodiment of the present disclosure, a method for providing an adaptive audio environment may include outputting at least one sound that is responsive to an image provided in the first sensor data.

In accordance with at least one embodiment of the present disclosure, a method for providing an adaptive audio environment may include use of second sensor data that includes physio data for the user. For at least one embodiment, the at least one sound may be responsive to the physio data.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to devices, systems and processes for providing adaptive audio environments. As described herein, the various embodiments of the present disclosure are directed to detecting, analyzing and processing one or more aspects of a user's then arising total environment and, in response thereto, providing an adaptive audio environment.

Various embodiments of the present disclosure may also be directed to providing an adaptive audio environment that is future looking and seeks to optimize the user's then arising current audio environment in view of an anticipated, planned, predictable, or otherwise reasonably determinable future total environment. As used herein a reasonably determinable future total environment is one arising where the probability the future total environment arising is greater than 90 percent. A non-limiting example of such a future total environment, in view of which the various embodiments of the present disclosure may optimize a user's current audio environment, is a sports star preparing for an athletic event; where the adaptive audio environment provided seeks to maximize the sports star's concentration on the upcoming event, while minimizing other distractions. Another non-limiting example of such a future total environment, in view of which the various embodiments of the present disclosure may provide an adaptive user current audio environment, include a user walking along a non-busy sidewalk approaching a busy intersection, the user's then current audio environment may provide an adapted audio profile requiring less user attention to their surroundings, which audio profile adjusts as the user approaches the busy intersection to facilitating more user attention to their surroundings.

In accordance with at least one embodiment, a user's audio environment may be adapted by use of any audible device(s). The audible device(s) may be personal to the user, and non-limiting examples of such audible devices include in-ear and over-ear speakers, such as headphones, ear buds and the like. Likewise, audible devices may be non-personal with respect to a given user and may be directed to an enclosure, such as speakers in a car or home, or to an environment, such as speakers in a public facility, train, bus, office, or otherwise. For at least one embodiment, adaptation of an audio environment may include adjustments to either and/or both of personal audible devices and/or non-personal audible devices.

Figure 1:
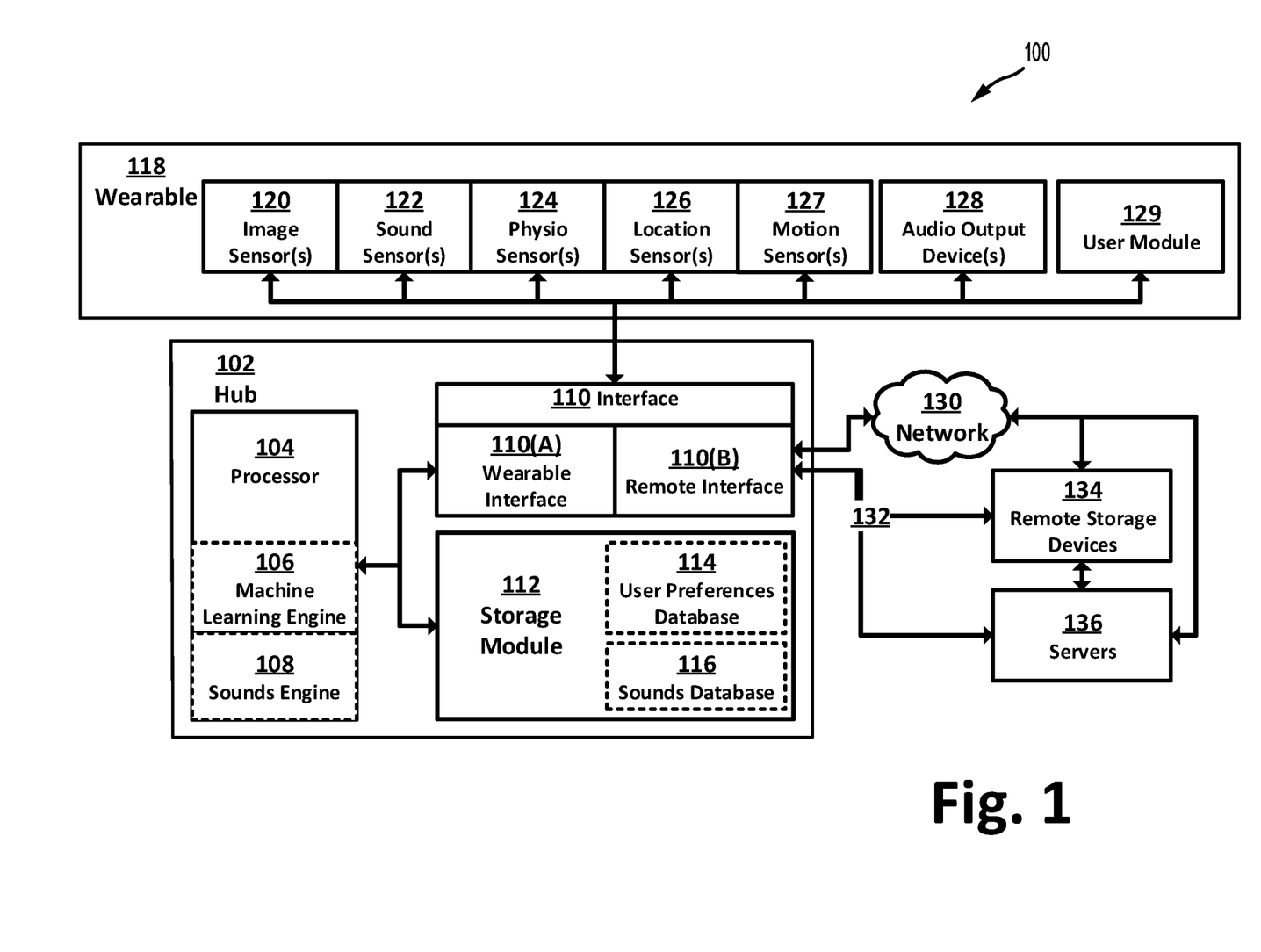
FIG. 1 is schematic diagram of a system for providing an adaptive audio environment in accordance with at least one embodiment of the present disclosure.

As shown in FIG. 1, for at least one embodiment of the present disclosure, a system 100 for providing an adaptive audio environment may include a hub 102 and a wearable device 118.

Hub

The hub 102 may include one or more processor modules 104 configured to provide, at least, a machine learning engine 106 and a sounds engine 108. A processor module 104 may be configured from any desired data and/or signal processing capabilities. For at least one embodiment, a processor module 104 may have access to one or more non-transitory processor readable instructions, including instructions for executing one or more applications, engines, and/or processes configured to instruct the processor to perform computer executable operations (hereafter, "computer instructions"). A processor module 104 may use any known or later arising processor capable of providing and/or supporting the features and functions of the hub 102 as needed for any given intended use thereof and in accordance with one or more of the various embodiments of the present disclosure. For at least one non-limiting embodiment, a processor module 104 is configured as and/or has the capabilities of a 32-bit or 64-bit, multi-core ARM based processor. For at least one embodiment, the hub 102 may arise on one or more backend systems, such as server systems or otherwise.

A processor module 104 may be configured to execute computer instructions and/or data sets obtained from one or more storage modules 112. As further shown in FIG. 1 and for at least one embodiment of the present disclosure, a hub 102 may include an interface module 110. The interface module 110 may include one or more remote interface modules 110(B). For at least one embodiment, the storage modules 112 may include use of remote storage devices 134 that may be communicatively coupled to the hub 102 by use of the one or more remote interface modules 110(B) and a network connection 130 and/or via one or more direct connection(s) 132, or combinations thereof. It is to be appreciated that the storage modules 112 and/or remote storage devices 134 (each a "storage component") may be configured using any known or later arising data storage technologies. In at least one embodiment, a storage component may be configured using flash memory technologies, micro-SD card technology, as a solid-state drive, as a hard drive, as an array of storage devices, or otherwise. A storage component may be configured to have any desired data storage size, read/write speed, redundancy, or otherwise. A storage component may be configured to provide temporary/ transient and/or permanent/non-transient storage of one or more data sets, computer instructions, and/or other information. Data sets may include, for example, information specific to a user, such as those provided by a user preference database 114, information relating to one or more sounds, such as those provided by a sounds database 116, or other information. Computer instructions may include firmware and software instructions, and data for use in operating the hub 102. Such data sets may include software instructions configured for execution by the processor module 104, another module of the hub 102, a wearable device 118, or otherwise. Such computer instructions provide computer executable operations that facilitate one or more features or functions of a hub 102, a wearable device 118, or otherwise. A storage component may be further configured to operate in conjunction with one or more servers 136. The one or more servers 136 may be coupled to the hub 102, a wearable device 118, remote storage devices 134, other devices that are internal and/or external device to the hub 102 and/or the wearable device 118, or otherwise. The server(s) 136 may be configured to execute computer instructions which facilitate in whole, or in part, the providing of an adaptive audio environment in accordance with at least one embodiment of the present disclosure. For at least one embodiment, one or more of the storage components may be configured to store one more data sets, computer instructions, and/or other information in encrypted form using known or later arising data encryption technologies.

As further shown in FIG. 1 and for at least one embodiment of the present disclosure, the interface module 110 may include a wearable interface module 110(A). The wearable interface module 110(A) may be configured to facilitate communications between the hub 102 and a wearable device 118. The interface module 110 may utilize any known or later arising technology to establish, maintain, and operate one or more links between the hub 102, the wearable device 118 and remote servers 136, remote storage devices 134, or other devices. Such links may arise directly, as illustratively shown by direct connection 132, or using network or other communications technologies, as illustratively shown by network 130. Non-limiting examples of technologies that may be utilized to facilitate such communications in accordance with one or more embodiments of the present disclosure include, but are not limited to, Bluetooth, ZigBee, Near Field Communications, Narrowband IOT, WIFI, 3G, 4G, 5G, cellular, and other currently arising and/or future arising communications technologies. The interface module 110 may be configured to include one or more data ports for establishing connections between a hub 102 and another device, such as a laptop computer. Such data ports may support any known or later arising technologies, such as USB 2.0, USB 3.0, ETHERNET, FIREWIRE, HDMI, and others. The interface module 110 may be configured to support the transfer of data formatted using any desired protocol and at any desired data rates/speeds. The interface module 110 may be connected to one or more antennas (not shown) to facilitate wireless data transfers. Such antenna may support short-range technologies, such as 802.11a/c/g/n and others, and/or long-range technologies, such as 4G, 5G, and others. The interface module 110 may be configured to communicate signals using terrestrial systems, space-based systems, and combinations thereof systems. For example, a hub 102 may be configured to receive GPS signals from a satellite directly, by use of a wearable device 118, or otherwise.

The processor module 104 may be configured to facilitate one or more computer engines, such as a machine learning engine 106 and a sound engines 108. As discussed in further detail below, each of these engines are configured to execute at least one computer instruction. For at least one embodiment, the machine learning engine 106 provides the capabilities for the hub 102 and wearable device 118 to determine and output one or more data sets identifying at least one characteristic of a desired adaptive audio environment, at a given time, in view of at least one of a then or future arising total environment, one or more user preferences, one or more wearable device capabilities, and the like. For at least one embodiment, the sounds engine 108 provides the capabilities for the hub 102 to identify and provide an adaptive audio environment, at any given time, in view of the one or more data sets output by the machine learning engine. As used herein, it is to be appreciated that music and sounds are used interchangeably, with the former being a collection of the latter. Further, it is to be appreciated that sounds provided by one or more of the various embodiments of the present disclosure are generally those provided a frequencies within 20 Hz and 20 kHz—which is the typical human sound perception range. However, other frequencies may be utilized for one or more embodiments of the present disclosure. The machine learning engine 106 may utilize data obtained from a storage component, such as data provided in a user preference database 114 and/or in a remote storage device 134. The sounds engine 108 may utilize data obtained from a storage component, such as data sets provided in a sounds database 116 and/or in a remote storage device 134. As illustratively shown in FIG. 1, a user preference database 114 and a sounds database 116 may be provided local to a hub 102 in the storage module 112. It is to be appreciated, however, that a user preference database 114 and/or sounds database 116 may be provided and/or augmented, in whole or in part, using data stored in a wearable device 118. Further, it is to be appreciated that data sets in any given storage component may be updated, augmented, replaced or otherwise managed, in whole or in part, based upon any then arising or future arising audio environment to be generated for a given user.

Wearable Device

As further shown in FIG. 1 and for at least one embodiment of the present disclosure, a wearable device 118 is configured to capture, monitor, detect and/or process a user's then arising current environment and, in response thereto and/or in anticipation thereof, provide an adaptive audio environment. For at least one embodiment, a wearable device 118 may be provided by a smartphone, smartwatch, tablet, laptop computer, personal computer, fitness tracker, or similar personal computing device. For at least one embodiment, the wearable device 118 may include various sensors. Sensors, individually and/or collectively, may be utilized to identify, characterize, define, monitor and otherwise assess one or more aspects of a user's then arising total environment. Non-limiting examples of such sensors include image sensors 120, sounds sensors 122, physio sensors 124, location sensors 126, and motion sensors 128. Other sensors (not shown) may be utilized. Any desired types, combinations, permutations and/or configurations of one or more sensors may be used in a desired implementation of an embodiment of the present disclosure.

For at least one embodiment, a wearable device 118 may include one or more image sensors 120 configured to capture, monitor, detect and/or process image-based aspects of a user's total environment. Image sensors 120 may operate with respect to motion, still, intermittent, or other image capture protocols. Image sensors 120 may be provided for any desired field-of-view, such as a frontal view, a 360-degree view, or otherwise. Image sensors 120 may provide for visual field monitoring in any desired wavelengths of the electromagnetic spectrum, including but not limited to visible wavelengths, infra-red wavelengths, and otherwise. Wavelengths and/or spectrums utilized by an image sensor 120 may vary based upon a then arising total environment, time of day, user preference, or otherwise. For example, during daytime, an image sensor 120 may utilize human visible wavelengths, whereas during nighttime, foggy or other diminished light conditions, infrared or other wavelengths may be additionally and/or alternatively utilized. Images captured by an image sensor 120 may be proceed by image processing capabilities provided by an image sensor 120 itself, or by capabilities provided, in whole or in part or in combination with any of the wearable device 118, the hub 102, a server 136, or otherwise.

For at least one embodiment, a wearable device 118 may include one or more sound sensors 122 configured to capture, monitor, detect and/or process sound-based aspects of a user's current total environment. Sound-based aspects may include then external sounds (e.g., honking horns, sound patterns (e.g., human speech), or otherwise, as well as internal sounds, such as those generated by a wearable device 118. External and internal sounds may arise persistently, intermittently or otherwise. Sound sensors 122 may be provided for any desired sound-field, such as a frontal field, a 360-degree field, or otherwise. Sound sensors 122 may provide for sound field monitoring, filtering, processing, analyzing and other operations at any one or more frequencies or ranges thereof. Sound sensors 112 may be configured to filter, enhance, or otherwise process sounds to minimize and/or eliminate noise, enhance certain sounds while minimizing others, or as otherwise desired as then configured by a user, a computer instruction executing by a wearable device 118 or a hub 102, or otherwise. Sounds captured by a sound sensor 122 may be proceed by sound processing capabilities provided by the sound sensor 122, the wearable device 118, the hub 102, a server 136, and/or any desired combinations or permutations of the foregoing.

For at least one embodiment, a wearable device 118 may include one or more physio sensors 124 configured to capture, monitor, detect and/or process physiological-based aspects of a user's total environment (herein, "physio-aspects"). Examples of such physio-aspects include a user's perspiration, heart rate, blood pressure, brain waves, forces exerted by or on the user, and otherwise. Physio-aspects may arise persistently, intermittently or otherwise. Data from physio sensors 124 may be processed by processing capabilities provided by the physio sensor 124, the wearable device 118, the hub 102, a server 136, and/or any desired combinations or permutations of the foregoing. One example of a physio sensor that may be configured for use with at least one embodiment of the present disclosure is an EMOTIV EPOC+14 CHANNEL MOBILE EEG™, manufactured by Emotiv Inc. For at least one embodiment, a physio sensor 124 may be configured to monitor, capture, detect and/or process a user's emotions, as represented by brain waves, or other physio-psychological indicators, such as perspiration, sudden movements of one or more body parts, or otherwise.

For at least one embodiment, a wearable device 118 may include one or more location sensors 126 configured to capture, monitor, detect and/or process a user's location in its total environment. Examples of location sensors include those using global positioning satellite (GPS) system data and otherwise. Data from location sensors 126 may be processed by processing capabilities provided by the location sensor 126, the wearable device 118, the hub 102, a server 136, and/or any desired combinations or permutations of the foregoing.

For at least one embodiment, a wearable device 118 may include one or more motion sensors 127 configured to capture, monitor, detect and/or process a user's change of motion or orientation, such as by acceleration, deceleration, rotation, inversion or otherwise in a given user's current total environment. A non-limiting example of a motion sensor is an accelerometer. Data from motion sensors 127 may be processed by processing capabilities provided by the motion sensor 127, the wearable device 118, the hub 102, a server 136, and/or any desired combinations or permutations of the foregoing.

For at least one embodiment, a wearable device 118 may include one or more audio output device(s) 128 configured to provide audible sounds to a user. Examples of audio output device(s) 128 include one or more ear buds, headphones, speakers, cochlear implant devices, and the like. Audible signals to be output by a given audio output device 128 may be processed using processing capabilities provided by the audio output device 128, the wearable device 118, the hub 102, a server 136, and/or any desired combinations or permutations of the foregoing. For at least one embodiment, audio output devices 128 are personal to a given user. In other embodiments, audio output devices 128 may be configured to include non-personal audio devices which provide audio signals to other persons or objects, such as one or more persons within a desired proximity of the user of the wearable device 118, animals or otherwise. Examples of such non-personal audio output devices include speakers, horns, sirens, and the like. Sounds output by non-personal audio devices may or may not be perceptible by a user of the wearable device 118.

For at least one embodiment, a wearable device 118 may include one or more user module(s) 129 configured to provide an interface between the wearable device 118 and the user. The user module 129 may be configured to include user input and output interfaces, such as by use of buttons, touch screens, voice, motion, visual displays, haptic feedback, or otherwise for use in facilitating user control and/or operation of a wearable device 118.

Figure 2:
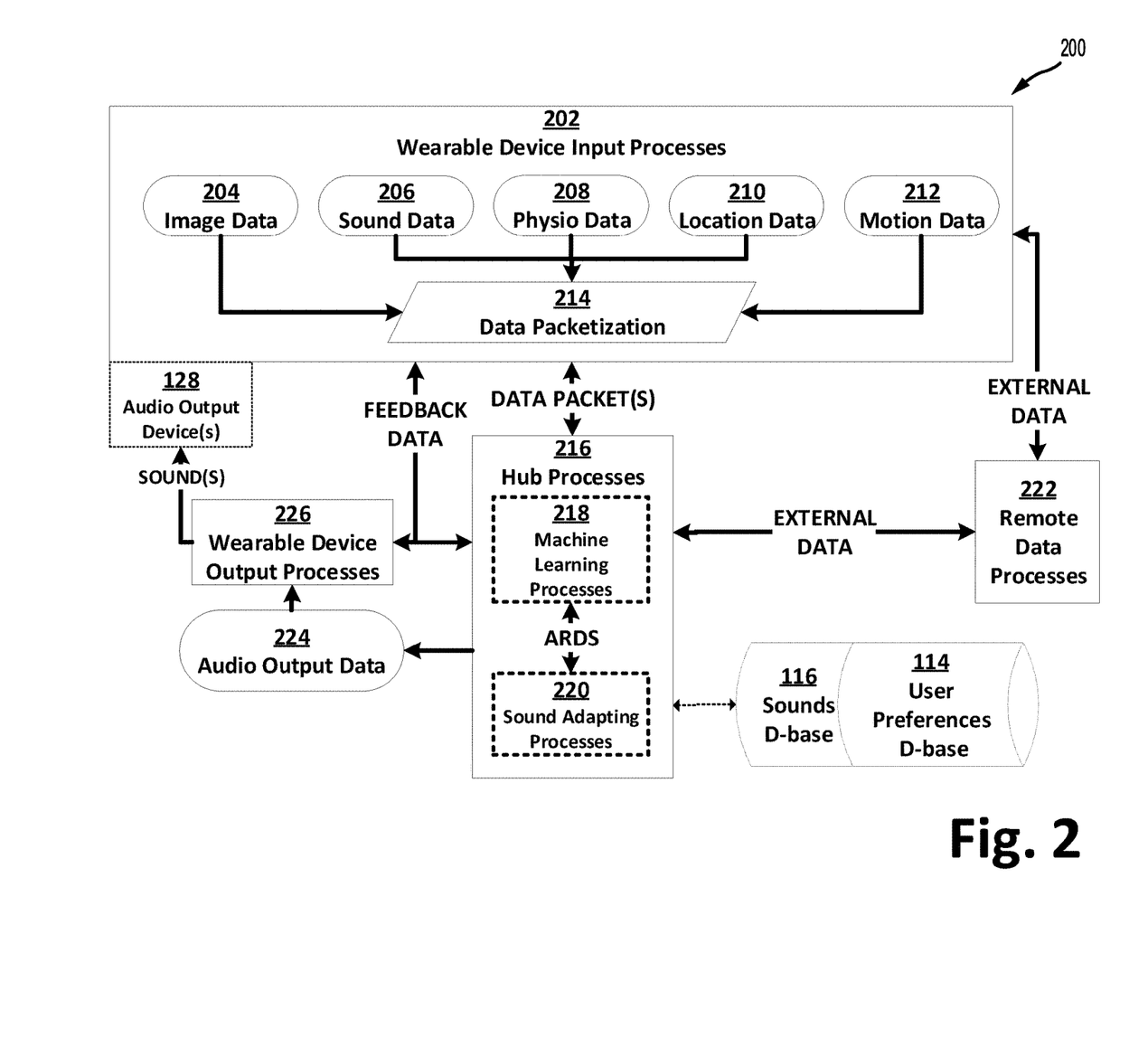
FIG. 2 is a schematic diagram of a software architecture configured for use in providing an adaptive audio environment in accordance with at least one embodiment of the present disclosure.

In FIG. 2, one embodiment of a software architecture 200 for use with one or more embodiments of the present disclosure is shown. As shown, a wearable device 118 and a hub 102 include one or more processes each including computer instructions, for processing data output by one or more sensors and, in response thereto, provide an adaptive audible environment. The processes of FIG. 2 are depicted with respect to the use of data from one or more sensors providing, for example, image data 204, sound data 206, physio data 208, location data 210, and motion data 212. It is to be appreciated, that the various embodiments of the present disclosure may be configured for use in conjunction with data provided by as few as one sensor and/or in conjunction with data from any number of two or more or sensors and/or external data from an external source, such as data from a hub 102, or a server 136, and in any desired combinations or permutations thereof. The sensor data may be processed, in whole or in part, by a wearable device 118 by executing one or more wearable device input processes 202, such as a data packetization process 214 whereby a wearable device 118 collects a set of data provided by one or more sensors at a given time, and/or over a desired period, and packetizes such data for processing by the hub 102.

For at least one embodiment, wearable device input processes 202 for image data 204 may include collecting an image on a pre-determined interval, such as every "I" milliseconds, where "I" varies based on the type of (in) activity in which a user of a wearable device 118 is then engaging and/or in view of current total environment characteristics, where such current total environment characteristics may be user specified, based on machine learning processes 218, determined by a wearable device based on sensor data, or otherwise determined. This process may result in the generation of image data 204 that can be further processed by the data packetization process 214 to eliminate redundant and/or unnecessary image data. For example, a wearable device 118 used by user then engaging in the driving of a vehicle may be configured to automatically use a different image capture rate, and image processing routines differently than are used when the user is engaged in a passive activity, such as the reading of a book. Accordingly, it is to be appreciated that image data 204 provided by an image sensor 120 and processed by a wearable device 118 may vary based on one or more factors, including activity type, image data type (e.g., visible light vs infra-red), then arising total environment, anticipated future total environment, or otherwise.

Further, the wearable device processes 202 may include adjusting operating characteristics of an image sensor 204 and image data 204 generated using local image data processing. For example, a wearable device 118 may be configured to recognize that a user is engaged in reading activities, such recognition being based, for example, upon a frequency of change in an image captured by an image sensor 120, or upon an instruction provided by a user input provided via user module 129. When so configured, an image sensor 120 may be configured to engage in eyeball tracking operations, such that words read over a given time period can be collected and packetized for providing to the hub 102, with further analysis being accomplished by one or more hub processes 216 such as machine learning processes 218 and/or by a server 136.

Similar processes may arise with other sensor data, including sound data 206. More specifically and for at least one embodiment, wearable device input processes 202 may include computer instructions directed to the capturing of sound data 206 as desired, such as at a given instance of time, on a desired interval, or otherwise. A desired interval may be, for example, every "S" milliseconds, where "S" varies based on the type of (in)activity in which a user of a wearable device is then engaging, user settings, user preferences, external data, and/or one or more characteristics of a current total environment or a future total environment, where such current or future total environment characteristics may be user specified, based on machine learning processes 218, determined by a wearable device based on sensor data, based on external data, or otherwise determined. For example, in a static total environment where a steady background noise exists, such as on an airplane, sound data 206 may be provided at a lower frequency to the data packetization processes 214 as compared to when a user is in a dynamic total environment, such as on a trading pit of a commodities exchange.

Similar processes may arise with other sensor data, including physio data 208. More specifically and for at least one embodiment, wearable device input processes 202 may include those directed to capturing physio data 208 at a given time and/or on a given interval. The given interval may be, for example, every "P" milliseconds, where "P" varies based on the type of (in)activity in which a user of a wearable device is then engaging and/or other current or future total environment characteristics. Such current or future total environment characteristics may be user specified, based on machine learning processes 218, determined by a wearable device based on sensor data, based on external data, or otherwise determined. For example, physio data 208 processed by a wearable device 118 may range across a wide gamut of physio data types and include basic physiological indicators, such as heart rate, temperature, respiratory rate, and the like. Physio data types may also include intermediate physiological indicators, such as indications of a user's mental alertness with such alertness potentially varying based upon a user's individual characteristics and/or then arising of future arising characteristics of a user's total environment, such as currently being tired or rested or in the future needing to rest. Physio data types may also include advanced physiological indicators, such as the emotional state of a user at a given time, non-limiting examples of such emotional states may include being happy, sad, indifferent, placid, frightened, at rage, or otherwise. The wearable device input processes 202 may be configured to capture such physio data 208 and using data packetization processes 214 process the data into a desired set of data responsive to the then arising current total environment or a desired future arising current environment for the user. For example, the wearable device processes 202 may be configured to generate a first data set for a user in a flight condition, driving a motor vehicle that is different than a second data set for a user calmly reading the comics. Similarly, wearable device processes 202 may be configured to prepare a user mentally for a future arising current environment, such as a rest period after an athletic endeavor, in view of a user's then detected current mental and/or physiological state.

Similar processes may arise with other sensor data, including location data 210. More specifically and for at least one embodiment, wearable device input processes 202 may include those directed to capturing location data 210 on a then desired interval. The desired interval may be, for example, every "L" milliseconds, where "L" varies based on the location of the user and type of (in)activity in which a user of a wearable device is then engaging and/or in view of other current environment characteristics. For example, location data 210 for a static user, e.g., one reading a book in their home, may be processed and packetized by data packetization process 214 for communication to the hub 102 on a less frequent basis than location data 210 is processed and packetized for a then traveling user.

Similar processes may arise with other sensor data, including motion data 212. More specifically and for at least one embodiment, wearable device input processes 202 may include those directed to capturing motion data 212 on a then desired interval. The desired interval may be, for example, every "M" milliseconds, where "M" varies based on the type of (in)activity in which a user of a wearable device is then engaging and/or other current or desired future total environment characteristics, where such current and/or future total environment characteristics may be user specified, based on machine learning processes 218, determined by a wearable device based on sensor data, based on external data, or otherwise determined. For example, motion data 212 processed by a wearable device input process 202 for a user engaged in an athletic pursuit, such as a bicycle journey or rowing sojourn, may vary from motion data 212 processed for a user engaged in reading a book. It is to be appreciated that motion data may include various types of data including acceleration, deacceleration, orientation changes, speed changes, relative speed, rate of ascent or decent, slope, and the like. Such motion data may arise independent of and/or in view of location data, for example, motion data for a downhill skier versus motion data versus that for a track runner may vary due to the topography indicated by location data.

Similar processes may arise with regards to other data sets, including data sets not provided by a sensor on or communicatively coupled to a wearable device 118. For example, external data may include weather data may be provided to a wearable device and used by one or more wearable device input processes 202 in determining which types and the frequency at which one or more other forms of sensor data are packetized by data packetization process 214. For example, weather data providing indications of severe conditions may result in greater monitoring of a user's physio data to verify their current health is not undesirably stressed. Similarly, external data may include calendar and other indications of planned future events, in anticipation of which the system 100 may provide an adaptive audio environment directed to enhancing the user's participation in, enjoyment of, or otherwise of such future event. For at least one embodiment, wearable device input processes 202 may include those directed to processing such external data on a then desired interval. The desired interval may be, for example, every "O" milliseconds, where "O" varies based on the type of (in)activity in which a user of a wearable device is then engaging and/or other current and/or future total environment characteristics, where such current and/or future total environment characteristics may be user specified, based on machine learning processes 218, determined by a wearable device based on sensor data, or otherwise determined. It is to be appreciated that each of the periods I, S, P, L, M and O may overlap, occur jointly, independently, vary in length, occur many times a second, once a minute, or otherwise, may start at a similar time or otherwise occur, for any given user, and in view of any current or future arising total environment.

As shown in FIG. 2, the software architecture 200 may include one or more hub processes 216 that are executed by a hub 102, such hub processes 216 include computer instructions. As discussed above, each hub 102 may be configured to include a machine learning engine 106 executing computer instructions facilitating one or more machine learning processes 218. It is to be appreciated that the one or more machine learning processes 218 utilized by hub 102 to facilitate the providing of an adaptive audio environment to a user will vary based upon the current and/or future total environment, as such total environment being represented in the information ("data packets") provided by a wearable device's data packetization processes 214. As shown in FIG. 2, a bi-directional connection may be provided between wearable device input processes 202, which include data packetization process 214, and hub processes 216.

For at least one embodiment, a first non-limiting example of a machine learning process 218 executed by a machine learning engine 106 may include the processing of images to recognize objects, environments, words, colors, people, locations, and otherwise. For example, a user riding a bicycle may result in a machine learning process 218 recognizing and analyzing the status of moving objects such as vehicles and pedestrians, while providing less analysis for fixed objects, such as buildings. Similarly, machine learning processes 218 for a bicyclist may be configured to analyze sound data 206 indicative of an impending or actual danger, such as honking car horn, while disregarding non-threatening sounds, such as a normal street noise. Machine learning processes 218 for such a current total environment may also include analyzing sound data 206 to detected words, sounds environments, songs, or otherwise. Similarly, machine learning processes 218 for such a current total environment may include computer instructions for analyzing physio data 208 indicative of such cyclist current condition. Certain data, such as physio data 208 indicating the bicyclist is exceeding a desired heart rate or other physiological parameter, may be processed differently than other data. Similarly, machine learning processes 218 for such a bicyclist may be configured to analyze physio data 208 indicative of the cyclist's then arising mental state, such as anger, fear, caution, lack thereof, or otherwise. Similarly, machine learning processes 218 for such bicyclist may be configured to analyze location data 208. Such location data 208 may be indicative of a cyclist's compliance with speed limits, traffic rules, type of roadway, impending obstacles, or otherwise. Similarly, machine learning processes 218 for such bicyclist may be configured to analyze motion data 212 indicative of a cyclist's then speed and orientation (e.g., have they fallen or are still upright). Any of the available data may be prioritized, ignored or otherwise processed by the machine learning processes 218 based upon a current total environment, a future total environment, or elements of such environments.

Based upon one or more of the various data packets provided by a wearable device 118 to a hub 102, external data and/or one or more machine learning processes 218, the hub processes 216 may be configured to generate an action-reaction data set (an "ARDS"). For at least one embodiment, an ARDS may be generated by a machine learning process 218 based upon external data provided from a remote data source such as a server 136 and/or remote storage device 134. The external data provided to a machine learning process 218 may be the same as, an update to, and/or different data that is provided, if any, to a wearable device 118. It is to be appreciated that a machine learning process may be configured to access one or more remote data processes 222 to obtain external data based upon one or more of the data packets received from a wearable device 118 at a given time. The ARDS identifies one or more characteristics of a user's current total environment that the providing of an adaptive audio environment desirably addresses. For example, a current total environment involving fright conditions may result in an ARDS providing a soothing adaptive audio environment.

As further shown in FIG. 2, the ARDS data may be provided by one or more machine learning processes 218 to a sounds engine 108 configured to execute one or more computer instructions facilitating sound adapting processes 220. Based on ARDS data and information stored in the sounds database 116, the sound adapting processes 220 may be configured to identify one or more audible sounds that the wearable device 118 can output at a given time and/or for a given duration to provide a then desired adaptive audio environment. Such audible sounds may be obtained from the sounds database 116, from an external data source, or otherwise and may include one or more sound forms including but not limited to, human voices, music, words, audible tracts, sirens, pitches, tones, or otherwise (collectively, "sounds"). Based on the ARDS data, the one or more sound adapting processes 220 may be configured to identify those one or more sounds that match a current total environment and/or may be used to adjust a user's current total environment to a new desired future total environment, for example, destressing a stressful situation by playing soothing sounds, versus increasing a user's adrenaline in anticipation of a sporting endeavor by providing upbeat sounds.

More specifically and for at least one embodiment, the sounds engine 108 may include one or more sound adapting processes 220 configured to perform one or more operations including, but not limited to: identifying sounds available in the sounds database 116; identifying sounds available from a remote database, such as one provided on one or more remote storage devices 134; linking, organizing, and/or otherwise processing sounds into one or more playlists, compilations or other collections of sounds; parsing or otherwise associating sounds or portions thereof with various characteristics including, but not limited to, tempo, speed, genre, artist, type, beats-per-minute, bit rate, sample rate, encoding format, number of channels available, stored volume, duration, file size, profile, ownership status, composer, year, album, and the like; and otherwise identifying and associating characteristics of sounds, or identifiable portions thereof, with one or more ARDS data sets. For example, an ARDS data set indicative of a flight situation arising from a speeding ambulance, may result in the sounds adapting processes 220 identifying one or more siren sounds to be provided from a given user's perspective, such as in-front, to the side of or behind the user, with varying perspectives resulting in varying sounds being identified to be output by the wearable device 118 at a given time.

For at least one embodiment, the sound adapting processes 220 may be configured to generate audio output data 224 for providing to a wearable device 118 based upon one or more user preferences, such as those provided by the user preferences database 114. User preferences may indicate how, when, where, at what volume, and otherwise various sounds are to be generated. For example, sound adapting processes 220 associate with a user that is tone deaf at particular frequencies may result in audio output data 224 being generated that is different than a user that is not so impaired. Likewise, user preferences for certain sounds may vary by then arising environment. For example, a user may prefer "rock" songs over "country" songs when preparing for a sporting match.

For at least one embodiment, the sound adapting processes 220 may be configured to generate audio output data 224 for providing to a wearable device 118 based upon one or more contextual environments. For example, upon determining that a user is reading a particular novel, the sounds provided by the wearable device 118 may change as the user progresses through the novel and/or in anticipation of such progression. For example, a first paragraph may invoke a calming sound being provided, while a next paragraph may invoke a triumphant or excited sound being provided. The determination of which sounds to presently and, in the future, provide, as specified in a given ARDS, may be based on the data packets received from the wearable device and external data indicative of the content of the novel at any desired level of granularity, such as on a chapter, page, paragraph, sentence or otherwise. In effect, one or more sound adapting processes 220 for the various embodiments of the present disclosure may be configured to provide a moving sound score similar to moving sound scores provided in association with television programming, movies, and otherwise.

The sound adapting processes 220 may be configured to output audio output data 224 from the hub 102 to one or more wearable device output processes 226. Wearable device output processes 226 execute computer instructions which facilitate the outputting of one or more sounds identified in the audio output data 224 to a user and/or others by use of one or more audio devices, such as ear buds, headphones, speakers or the like. The audio output data 224 may include an identification of a sound to be provided to a user and, for at least one embodiment, the identified sound itself. When only an identification is provided in the audio output data 224, the sound may be provided by the wearable device 118 using a sounds database (not shown) internal to the device and/or using an external sounds database accessible by such wearable device 118, such as a streaming sound source provided by a server 136.

The wearable device output processes 226 may further include computer instructions for configuring the wearable device 118 to receive and/or sense user responses to the identified sounds provided in the audio output data 224. For example, user reactions to a sound such as their "like" or "dislike" thereof may be received and/or sensed. Such sensing may occur using a physio sensor monitoring a user's brainwaves. Such reactions may be provided as "feedback data" from the wearable device 118 to the hub 102 and used by one or more of the hub processes 216, such as the machine learning processes 218 and sound adapting processes 218, to refine future selections of audio output data 224.

For at least one embodiment, wearable device output processes 226 may include computer instructions facilitating user control of provided adaptive audio environments based upon one or more user indicators in the feedback data. Such user indicators may be detected by use of one or more sensors, such as a sound sensor 122 detecting a user's spoke commands, e.g., "stop", "rewind", "skip", "louder", "softer", or a motion sensor 127 detecting a user's change of orientation or otherwise in response to a given sound. Such data may be used to refine the hub processes 216.

For at least one embodiment, one or more of the machine learning processes 218 and/or sound adapting processes 220 may be configured to engage in machine learning, which herein is defined as the application of artificial intelligence to learn and improve the processes based on experience and without being explicitly programmed. Machine learning may include use of supervised machine learning algorithms, unsupervised machine learning algorithms, semi-supervised machine learning algorithms, reinforcement machine learning algorithms and otherwise. The machine learning processes 218 and/or sound adapting processes 220 may be trained to use initial "default data", such as one or more generic total environment profiles and sounds corresponding therewith, to build mathematical models of subsequent total environment profiles and sounds corresponding therewith. Such default data may be provided by the hub 102 or external sources, such as server 136 or remote storage devices 134. Machine learning processes may be used to personalize a hub and wearable device and the adaptive audio environments provided thereby for a given user and in view of one or more characteristics of a current or desired future total environment.

Figure 3:
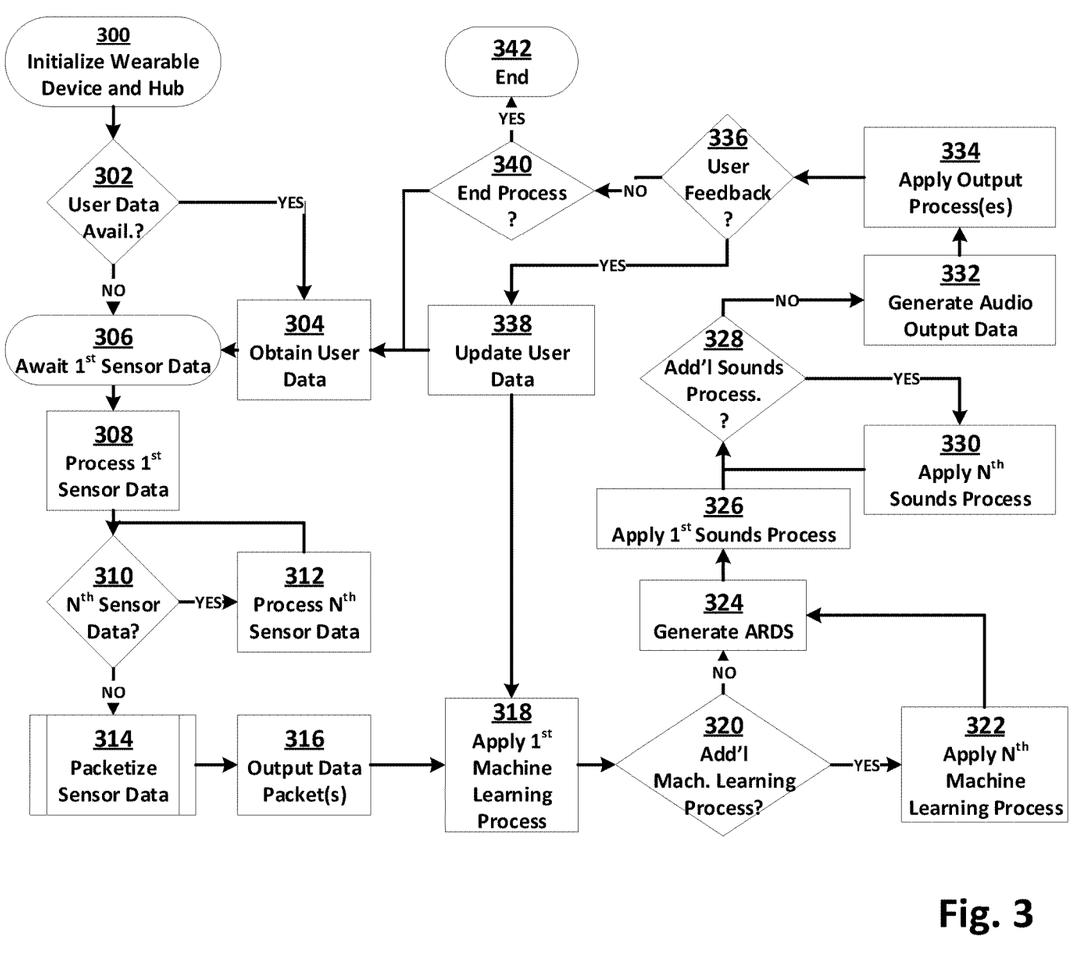
FIG. 3 is a flow chart illustrating a process for providing an adaptive audio environment in accordance with at least one embodiment of the present disclosure.

In FIG. 3, one embodiment is shown of a process for providing an adaptive audio environment. In Operation 300, the process may begin with initializing a wearable device and a hub. Initialization may involve loading default data into one or more of the user preferences database and/or sounds database, determining sensors available and configuring such one or more sensors for use with the given wearable device.

In Operation 302, the process may include determining whether user specific data is available and to be utilized. This determining may occur on one or more of the wearable device 118 and the hub 102. User specific data may include user preferences, sounds, device configurations, and other information. It is to be appreciated that audio output devices, sensors, and other components available to a user may vary with time, location, activity or otherwise. Thus, Operation 302 should be considered as including those determinations needed to characterize components (audio, sensors, data or otherwise) available to a user, by which and with which a system may provide an adaptive audio environment in view of a current or future total environment. Such user data and/or other data may be available, for example, from a previously populated user preferences database 114 and/or a previously populated sounds database 116. The user data may include one or more tags, identifiers, metadata, user restrictions, use permissions, or other information that identifies how and when such user data may be utilized. User data may also be available in the form of external data.

In Operation 304, the process may include obtaining the user data, in whole or in part, for use by the wearable device 118 and/or the hub 102 to generate audio output data 224 which provides an adaptive audio environment in view of a current or future total environment. While not expressly shown in FIG. 3, it is to be appreciated that the obtaining of user data may be an iterative process, and such process(es) may be based on a current total environment and/or a desired future total environment into which an adaptive audio environment is to be provided.

In Operation 306, the process may include obtaining sensor data from a first sensor, such as an image sensor 120. Any of the available sensors may be selected as the first sensor. For at least one embodiment, data from a first sensor may be prioritized and used to initialize characterize the current total environment, with data from other sensors being used to further characterize the current total environment. For other embodiments, sensor data may be weighted equally or as otherwise desired.

In Operation 308, the process may include processing the first sensor data. Such processing may be accomplished using one or more computer instructions provided by the sensor itself and/or one or more computer instructions provided by one or more wearable device process input processes 202.

In Operation 310, the process may include determining whether additional sensor data is available and to be processed. If such additional sensor data is available and is to be processed, per Operation 312, the process may include processing such additional sensor data. Such processing may occur using computer instructions provided by the sensor and/or one or more wearable device input processes 202. It is to be appreciated that one or more of Operations 308-310-312 may occur serially, in parallel, or otherwise. That is, for at least one embodiment a wearable device 118 may be configured to simultaneously process data from multiple sensor at substantially the same time, wherein substantially as used in this context refers to processing occurring without human perceptible differences in when such processing occurs.

In Operation 314, the process may include one or more data packetization processes 214. As discussed above, such processes process one or more sensor data sets (as provided per Operations 308-310-312) into one or more output data packets for communication to the hub 102. It is to be appreciated, that Operation 314 may arise repeatedly, iteratively, at any given time, or otherwise. For example, when data for a given sensor is ready for packetization and communication by a wearable device 118 to a hub 102, Operation 314 may occur with respect to only that available data, other available data, or otherwise.

In Operation 316, the process may include outputting one or more sets of data packets, by the wearable device 118, to the hub 102. The data packets may be output in any desired form and for communication over a desired communications system. The data packets may be output in clear or encrypted form, compressed, uncompressed, error redundant, and otherwise. The form of a data packet may vary based on the type of data being communicated, it being appreciated, for example, that image data may require a larger packet size than audio data. The wearable device 118 may be configured to schedule, prioritize, organize or otherwise control the sequencing of data packets outputting and size and types of content contained therein based upon then available sensor data and/or other variables. For example, the wearable device 118 may be configured to prioritize the sending of certain audible data, such as sirens, over image data.

In Operation 318, the process may include the hub 102 applying a first of one or more machine learning processes. The machine learning process applied may vary based on the size and type (e.g., image versus sound) of data provided in a given data packet. The one or more first machine learning processes applied may also vary and/or be independent or dependent on a previously applied machine learning process. For example, analysis of image motion data in a then received data packet may involve use of results and/or sub-processes applied for previously received data packets that include image motion data.

In Operation 320, the process may include determining whether one or more additional machine learning processes are to be applied to a data packet. If so, per Operation 322, the process may include applying the one or more additional machine learning processes to one or more data packets. It is to be appreciated that multiple machine learning processes may be applied individually, collectively, in aggregate or otherwise to a single or multiple data packets. Likewise, the application of a first machine learning process may result in a determination to apply a second or more machine learning processes. As such, the various embodiments are not intended to be limited to determining and/or applying any number of fixed or predetermined machine learning processes. Further, the determining of whether to apply an additional machine learning process may be optional where a given data packet has been previously subjected to a machine learning process, in which instance, Operations 318-322 may be bypassed. Further and for at least one embodiment, the determining of a machine learning process to apply may arise in view of external data, for example, weather data indicative of impending severe weather may result in the processing of a data packet utilizing additional and/or other machine learning processes than may occur when non-inclement weather is expected in a user's current total environment or future total environment.

In Operation 324, the process may include generating an ARDS. As discussed above, an ARDS identifies an action and one or more desire reactions thereto, where such reactions are expressed in terms of one or more sound characteristics. The ARDS may be generated after application of one or more machine learning processes to one or more data packets and/or external data. Multiple ARDS may be generated when dynamic situations exist or, even when static conditions exist, dynamic conditions seek to be audible emulated.

In Operation 326, the process may include applying a first sound adapting process. The sound adapting process may be applied based on the generated ARDS data, based on external data, or based on other data. In Operations 328 and 330, the process may include applying one or more second sound adapting processes. It is to be appreciated that one or more sound adapting processes may be utilized to generate audio output data.

In Operation 332, the process may include generating audio output data. The generated audio output data is provided by the hub 102 to the wearable device 118. For at least one embodiment, the generation of a audio output data in response to sensor data happens substantially real-time, as defined herein to mean without incurring humanly perceptible delays and/or non-consequential humanly perceptible delays, where non-consequential humanly perceptible delays are delays that do not commonly result in an adverse condition or status arising with respect to a given user of the wearable device 118.

In Operation 334, the process may include applying one or more output processes to the audio output data. As used herein, output processes commonly result in the generation of one more sounds. For at least one embodiment, such sounds are perceptible by the user of the wearable device 118. For at least one embodiment, such sounds are perceptible by a person other than and/or in addition to the user of the wearable device. For at least one embodiment, such sounds are perceptible by non-human entities, such as animals, automated processes, artificial beings, or otherwise.

In Operation 336, the process may include receiving user feedback in response to the application of the one or more output processes to the audio output data. Such user feedback may arise based on physical reactions, such as a verbal or physical indication that user "likes"/"dislikes" the sounds produced, cognitive reactions, such as the user thinking positively or negatively about the sounds produced, non-cognitive reactions, such as the user reacting instinctively to the sounds produced, or otherwise. It is to be appreciated that a user's reactions, or lack thereof, to sounds produced may be identified and/or associated with the user's then current total environment, or a characteristic thereof. Thus, it is to be appreciated that user feedback to any given sound may vary over time and environment.

In Operation 338, the process may include updating user data based on the feedback, or lack thereof, received per Operation 336. Updated user data may be used for subsequent sensor data processing and may be used to refine the providing of adaptive audio environments. Such updated data may be used to refine, tune, modify, update or otherwise configure one or more machine learning processes and/or one or more sound adapting processes. Accordingly, it is to be appreciated that at least one embodiment, provides an closed loop system by which the providing of adaptive audio environments "learns" and improves with time, events, total environments, and otherwise.

In Operations 340 and 342, the process may include determining whether to cease providing an adaptive audio environment, and if so, ending such providing. The ending of such providing may arise based upon any variable, such as wearable device 118 or hub 102 power status, elapsed time, user input, external data input, or otherwise.

The various operations shown in FIG. 3 are described herein with respect to at least one embodiment of the present disclosure. The described operations may arise in the sequence described, or otherwise and the various embodiments of the present disclosure are not intended to be limited to any given set or sequence of operations. Variations in the operations used and sequencing thereof may arise and are intended to be within the scope of the present disclosure.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

Further, a reference to a computer executable instruction includes the use of computer executable instructions that are configured to perform a predefined set of basic operations in response to receiving a corresponding basic instruction selected from a predefined native instruction set of codes. It is to be appreciated that such basic operations and basic instructions may be stored in a data storage device permanently and/or may be updateable, but, are non-transient as of a given time of use thereof. The storage device may be any device configured to store the instructions and is communicatively coupled to a processor configured to execute such instructions. The storage device and/or processors utilized operate independently, dependently, in a non-distributed or distributed processing manner, in serial, parallel or otherwise and may be located remotely or locally with respect to a given device or collection of devices configured to use such instructions to perform one or more operations.

What is claimed is:

1. A system comprising:
    an interface module communicatively coupling a wearable device and a hub; and
    a processor executing non-transient computer executable instructions for a machine learning engine which:
        applies a first machine learning process to at least one data packet received from the wearable device;
            wherein, based on the at least one data packet, the machine learning process:
            identifies a current environment and a future arising environment;
                wherein the future arising environment is an environment not presently presented to a user of the wearable device; and
            outputs an action-reaction data set;
                wherein the action-reaction data set is based on the future arising environment; and
                wherein the action-reaction data set is further based on a probability of non-presently occurring physio data for the user exceeding a probability threshold of occurring in the future arising environment; and
    a sounds engine applying computer instructions for a sound adapting process to the action-reaction data set and providing audio output data to the user of the wearable device via the interface module; and
        wherein the audio output data facilitates providing a user of the wearable device with an adaptive audio environment based upon the future arising environment.

2. The system of claim 1,
wherein the processor executes non-transient computer instructions to process first sensor data received from a first sensor.

3. The system of claim 2,
wherein the first sensor data includes image data.

4. The system of claim 2,
wherein the processor executes non-transient computer instructions to process second sensor data received from a second sensor.

5. The system of claim 4, comprising:
wherein the first sensor data is provided by a physio sensor and the second sensor data is provided by a motion sensor.

6. The system of claim 5,
wherein the processor executes non-transient computer instructions to process a data packet that includes the first sensor data and the second sensor data.

7. The system of claim 1,
wherein the wearable device further comprises:
    at least one motion sensor; and
    at least one audio output device.

8. The system of claim 7,
wherein the machine learning engine utilizes feedback data when applying a second machine learning process to second data packet received from the wearable device and output a second action-reaction data set;
wherein the sounds engine applies a second sound adapting process to the second action-reaction data set and provide second audio output data to the wearable device via the interface module; and
wherein the second audio output data is further utilized by the wearable device and the at least one audio output device to provide the adaptive audio environment.

9. The system of claim 7,
wherein the wearable device executes non-transient computer instructions for a wearable device output process; and
wherein the wearable device output process processes the audio output data for presentation to a user by the at least one audio output device.

10. The system of claim 1,
wherein the interface module communicatively couples the hub with at least one server.

11. The system of claim 10,
wherein a server communicates external data to the hub; and
wherein, based on the external data, the machine learning engine applies a second machine learning process to the at least one data packet received from the wearable device and outputs a second action-reaction data set.

12. A software architecture, encoded on at least one non-transitory computer readable medium, providing an adaptive audio environment, comprising:

a wearable device input process comprising non-transient computer instructions, executable by a wearable device, for:
   processing first sensor data received from a first sensor and outputting at least one data packet;
      wherein the processing of the first sensor data comprises identifying a future arising environment;
      wherein the future arising environment is an environment not presently presented to a user of the wearable device; and
      wherein the at least one data packet is output based on a probability of a non-presently occurring motion data for the user exceeding a probability threshold of occurring in the future arising environment;
a wearable device output process comprising non-transient computer instructions, executable by the wearable device, which when executed configure the wearable device to receive and process audio output data into at least one sound for use in providing a future arising adaptive audio environment to the user of the wearable device; and
wherein the audio output data is received after a processing of the at least one data packet by a hub.

13. The software architecture of claim 12,
wherein the first sensor data is received from a motion sensor.

14. The software architecture of claim 12 comprising:
a machine learning process comprising non-transient computer instructions, executable by the hub, which when executed configure the hub to process the at least one data packet into an action-reaction data set; and
a sound adapting process comprising non-transient computer instructions, executable by the hub, which when executed configure the hub to process the action-reaction data set into audio output data.

15. The software architecture of claim 14,
wherein the machine learning processes utilizes user preference data stored in a user preference database to process the at least one data packet into an action-reaction data set; and
wherein the sound adapting process utilizes sound data stored in a sounds database to process the action-reaction data set into the audio output data.

16. The software architecture of claim 15,
wherein at least one of the machine learning process and the sound adapting process comprise at least one supervised machine learning algorithm trained using an initial default data set corresponding to a generic total environment.

17. A method for providing an adaptive audio environment, comprising:
in a wearable device,
   receiving sensor data;
   processing the sensor data using at least one wearable device input process;
      wherein the processing of the sensor data comprises identifying a future arising environment;
      wherein the future arising environment is an environment not presently presented to a user of the wearable device;
   generating, based on the processing, a data packet;
      wherein the data packet is generated based on a probability of a non-presently occurring physio data and a non-presently occurring motion data for the user exceeding a probability threshold of occurring in the future arising environment;
   outputting the data packet to a hub device;
      wherein the data packet identifies the future arising environment;
   receiving audio output data from the hub device; and
   applying at least one wearable device output process to the received audio output data to produce sounds providing an adaptive audio environment for the user; and
in a hub device,
   receiving the data packet from the wearable device;
   applying in view of the identified future arising environment, at least one hub process to the data packet; and
   outputting the audio output data;
      wherein the audio output data is generated from the applying of the at least one hub process to the data packet; and
      wherein the applying of the at least one hub process occurs based at least upon the identified future arising environment.

18. The method of claim 17,
wherein the sensor data includes first sensor data received from an image sensor and second sensor data received from at least one of a sound sensor, a physio sensor, and a motion sensor.

19. The method of claim 18,
wherein the sounds are responsive to an image provided in the first sensor data.

20. The method of claim 19,
wherein the second sensor data includes physio data for the user; and
wherein the at least one sound is responsive to the physio data.

* * * * *